United States Patent
Hayashi

(10) Patent No.: US 10,674,406 B2
(45) Date of Patent: *Jun. 2, 2020

(54) BASE STATION, WIRELESS COMMUNICATION SYSTEM, AND COMMUNICATION METHOD

(71) Applicant: NEC Corporation, Tokyo (JP)

(72) Inventor: Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,490

(22) Filed: Dec. 31, 2018

(65) Prior Publication Data

US 2019/0141576 A1   May 9, 2019

Related U.S. Application Data

(63) Continuation of application No. 15/501,990, filed as application No. PCT/JP2015/067638 on Jun. 18, 2015, now Pat. No. 10,194,350.

(30) Foreign Application Priority Data

Aug. 7, 2014   (JP) .................................. 2014-161013

(51) Int. Cl.
*H04W 4/00* (2018.01)
*H04W 28/12* (2009.01)
(Continued)

(52) U.S. Cl.
CPC ........... *H04W 28/12* (2013.01); *H04W 16/32* (2013.01); *H04W 28/0268* (2013.01);
(Continued)

(58) Field of Classification Search
None
See application file for complete search history.

(56) References Cited

U.S. PATENT DOCUMENTS 7,062,568 B1   6/2006   Senevirathne et al.
10,194,350 B2 *   1/2019   Hayashi ............... H04W 88/08
(Continued)

FOREIGN PATENT DOCUMENTS

CN   103024816 A   4/2013
CN   103686834 A   3/2014
(Continued)

OTHER PUBLICATIONS

Alcatel-Lucent, Flow Control Design for DC split bearer option, 3GPP TSG-RAN WG3 Meeting #84, R3-141171, May 19-May 23, 2014, (Year: 2014).*

(Continued)

*Primary Examiner* — Clemence S Han
(74) *Attorney, Agent, or Firm* — Finnegan, Henderson, Farabow, Garrett & Dunner, L.L.P.

(57) ABSTRACT

This wireless communication system has a first base station, and a second base station whereby downlink data received from a core network can be transmitted to a terminal via the second base station and the first base station. The second base station transmits, to the first base station, information that makes it possible to identify whether or not flow control can be carried out.

9 Claims, 17 Drawing Sheets

9.2.yy Flow Control Periond
This information element indicates the time period of the flow control feedback

| IE/Group Name | Presence | Range | IE type and reference | Semantics description | Criticality | Assigned Criticality |
|---|---|---|---|---|---|---|
| Flow Control Period | M | | INTEGER(0..2047) | 0 means Flow Control Feedback is not requested. The value other than 0 mean the time period that SeNB is requested to give Flow Control Feedback | --- | --- |

(51) Int. Cl.
| | |
|---|---|
| H04W 16/32 | (2009.01) |
| H04W 72/04 | (2009.01) |
| H04W 92/20 | (2009.01) |
| H04W 88/08 | (2009.01) |
| H04W 28/02 | (2009.01) |
| H04W 28/08 | (2009.01) |

(52) U.S. Cl.
CPC .......... *H04W 72/04* (2013.01); *H04W 88/08* (2013.01); *H04W 92/20* (2013.01); *H04W 28/08* (2013.01)

(56) References Cited

U.S. PATENT DOCUMENTS

| | | | |
|---|---|---|---|
| 2013/0201841 | A1 | 8/2013 | Zhang et al. |
| 2015/0181473 | A1* | 6/2015 | Horn ................. H04W 36/0027 370/331 |
| 2015/0215827 | A1 | 7/2015 | Zhang et al. |
| 2015/0326456 | A1 | 11/2015 | Dudda et al. |
| 2015/0358945 | A1 | 12/2015 | Susitaival et al. |
| 2016/0028585 | A1 | 1/2016 | Wager et al. |
| 2016/0212790 | A1* | 7/2016 | Fujishiro ................. H04L 45/24 |
| 2016/0255551 | A1* | 9/2016 | Susitaival ........... H04W 36/023 370/334 |
| 2016/0338130 | A1* | 11/2016 | Park ....................... H04W 76/11 |
| 2017/0034866 | A1 | 2/2017 | Wager et al. |
| 2017/0164419 | A1 | 6/2017 | Kim |
| 2017/0272553 | A1 | 9/2017 | Yi et al. |

FOREIGN PATENT DOCUMENTS

| | | |
|---|---|---|
| EP | 1 969 877 B1 | 11/2015 |
| JP | 4-200032 | 7/1992 |
| JP | 2010-161793 | 7/2010 |
| WO | WO 2007/145035 A1 | 12/2007 |

OTHER PUBLICATIONS

Alcatel-Lucent, Alcatel-Lucent Shanghai Bell, Flow Control design for DC split bearer option, 3GPP TSG-RAN WG3 Meeting #84 R 3-141171, Seoul, Korea, May 19-May 23, 2014.
Huawei, HiSilicon, Radio bearer configuration and switch in dual connectivity, 3GPP TSG RAN WG2 Meeting #85bis, R2-141163, Mar. 31 to Apr. 4, 2014.
NEC, RAN Container in GTP-U, 3GPP TSG-RAN WG3#84, R3-141280, Seoul, Korea, May 19-23, 2014.
Notification of Reasons for Refusal dated Dec. 11, 2018, issued by the Japanese Patent Office (JPO) in counterpart Japanese Patent Application No. 2017-204699.
Chinese Office Action issued by the Chinese Patent Office in corresponding Application No. 201580054426.8, dated Jul. 2, 2019.
3GPP TS 36.322 V12.0.0, 3$^{rd}$ Generation Partnership Project; Technical Specification Group Radio Access Network; Evolved Universal Terrestrial Radio Access (E-UTRA); Radio Link Control (RLC) protocol specification (Release 12), Jun. 2014.
NEC, "Flow Control function over X2 for Dual connectivity", 3GPP TSG-RAN WG3#83bis, R3-140679, Mar. 2014.
NTT Docomo, Inc., "Necessity of flow control for inter-node UP aggregation", 3GPP TSG-RAN WG2 #83, R2-132438, Aug. 2013.
BlackBerry UK Limited, "Necessity of flow control for various U-plans alternatives", 3GPP TSG RAN WG2 Meeting #84, R2-134116, Nov. 2013.
International Search Report and Written Opinion dated Sep. 1, 2015, in corresponding PCT International Application.
3GPP TSG-RAN WG3#84 R3-141095, "Open issue resolution Flow Control and Delivery Feedback" May 19-23, 2014.
3GPP TSG-RAN Meeting #83bis, R3-140562, "Flow Control for Split Bearers" Mar. 31, 2014-Apr. 4, 2014.
3GPP TSG-RAN Meeting #83bis, R3-140560, "Flow Control for Split Bearers" Mar. 31, 2014-Apr. 4, 2014.
3GPP TSG-RAN Meeting #83bis, R-3-140641, "Flow Control Mechanism for 3C", Mar. 31, 2014-Apr. 4, 2014.
Notice of Grounds for Rejection dated Feb. 13, 2018, issued by the Korean Patent Office in counterpart Korean Patent Application No. 10-2017-7005550.
Decision to Grant Patent dated Sep. 26, 2017, issued by the Japanese Patent Office (JPO) in counterpart Japanese Patent Application No. 2016-539891.
3GPP TSG-RAN WG3#85 R3-142259, "Introduction of flow control periodicity on X2" Oct. 6-10, 2014.
3GPP TSG-RAN Meeting #83bis, R3-140701, "Flow control of split bearer assigned to SeNB" Mar. 31, 2014-Apr. 4, 2014.
Extended European search report dated Mar. 22, 2018, issued by the European Patent Office (EPO) in counterpart European Patent Application No. 15829835.6.
3GPP TSG-RAN WG2 Meeting #83b R2-133209, "Flow control and QoS-aware data forwarding" Oct. 7-11, 2013.
Notification of Reasons for Refusal dated Jul. 31, 2018, issued by the Japanese Patent Office (JPO) in counterpart Japanese Patent Application No. 2017-204699.
Ericsson; "Flow control for split bearer option" 3GPP TSG-RAN WG3 Meeting #83bis R3-140819, pp. 1-3 (2014).
Ericsson; "PDCP feedback and flow control" 3GPP TSG-RAN WG3 #84 R3-141325, pp. 1-6 (2014).
Ericsson; "PDCP feedback and flow control" 3GPP TSG-RAN WG2 #86 R2-142399, pp. 1-4 (2014).
LG Electronics Inc.; "Down-selection of UP protocol architecture alternatives" 3GPP TSG-RAN WG2 Meeting #82 R2-131812, pp. 1-4 (2013).
MediaTek Inc.; "User Plane Architecture" 3GPP TSG-RAN2 #82 Meeting R2-131777, pp. 1-3 (2013).
New Postcom; "Further consideration on UP protocol and architecture", 3GPP TSG-RAN WG2 Meeting #82 R2-132112, pp. 1-4 (2013).
Office Action issued by the Japanese Patent Office in corresponding application No. JP 2017-204699, dated Apr. 16, 2019.

* cited by examiner

OVERALL CONFIGURATION OF WIRELESS COMMUNICATION SYSTEM ACHIEVING DUAL CONNECTIVITY

CONNECTION CONFIGURATION OF C-PLANE IN DUAL CONNECTIVITY

CONNECTION CONFIGURATION OF U-PLANE IN DUAL CONNECTIVITY
(EXAMPLE OF SCG BEARER OPTION)

CONNECTION CONFIGURATION OF RADIO PROTOCOL IN DUAL CONNECTIVITY
(EXAMPLE OF SCG BEARER OPTION)

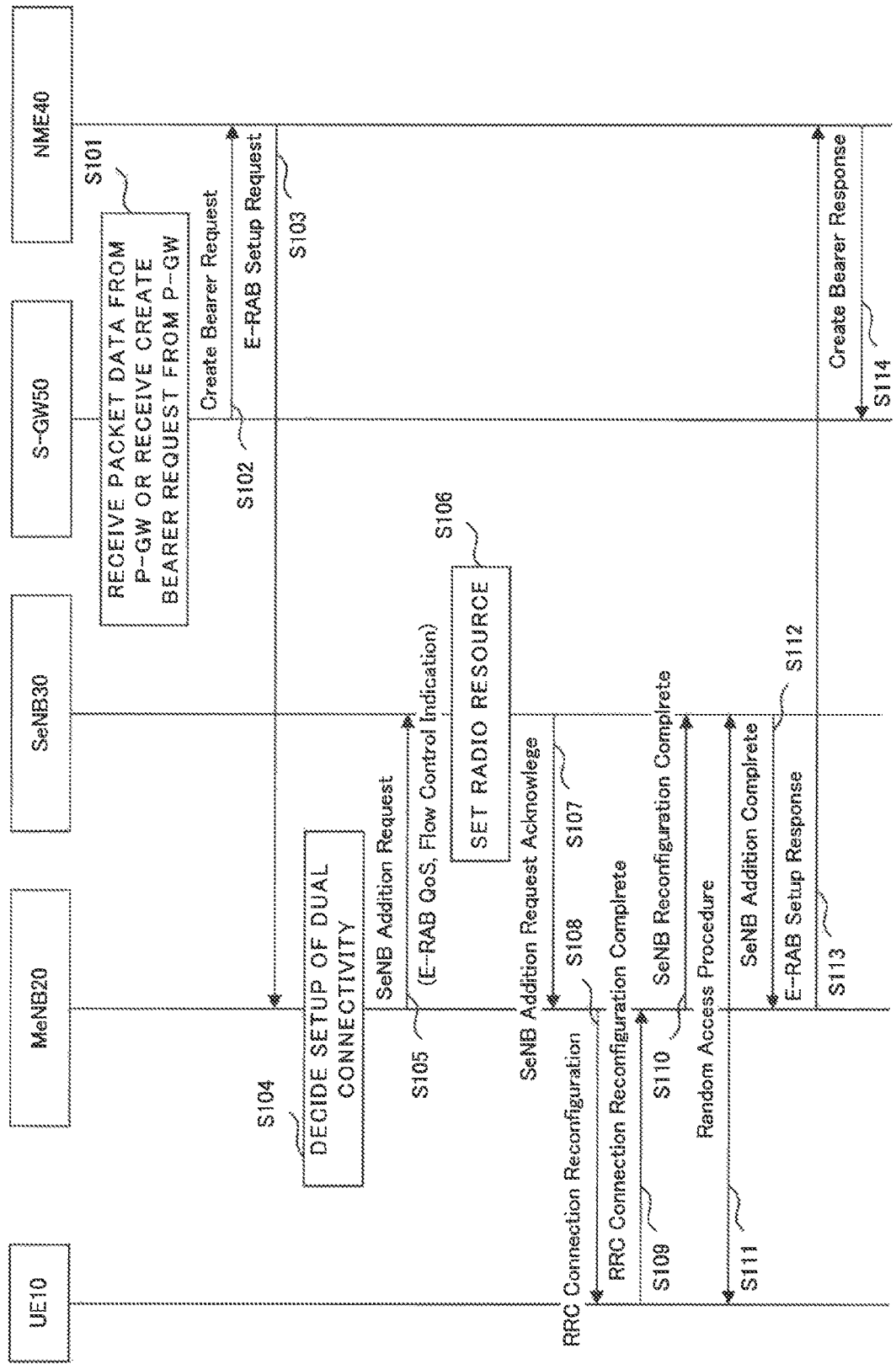

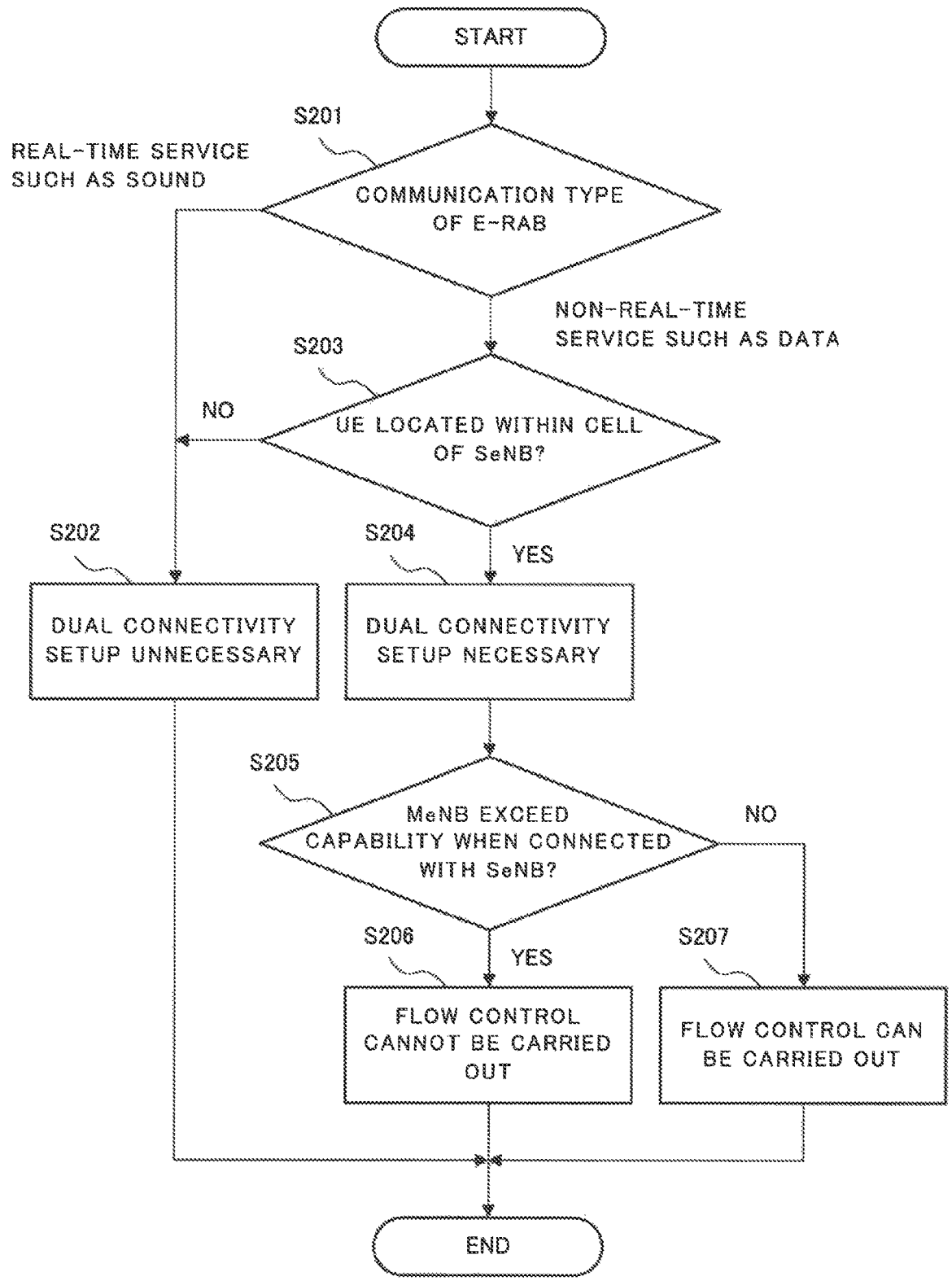

Fig. 13

SENB ADDITION REQUEST

This message is sent by the MeNB to the SeNB to request the preparation of resources for dual connectivity operation for specific UE
Direction: MeNB → SeNB.

| IE/Group Name | Presence | Range | IE type and reference | Semantics description | Criticality | Assigned Criticality |
|---|---|---|---|---|---|---|
| ... | | | | | | |
| E-RABs To Be Added List | | 1 | | | — | — |
| >E-RABsTo Be Added Item | | 1..<maxnoof Bearers> | | | EACH | reject |
| >>CHOICE Bearer Option | M | | | | — | — |
| >>>SCG Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>DL Forwarding | O | | 9.2.5 | | — | — |
| >>>>S1 UL GTP Tunnel Endpoint | M | | GTP Tunnel Endpoint 9.2.1 | SGW endpoint of the S1 transport bearer. For delivery of UL PDUs. | — | — |
| >>>Split Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>MeNB GTP Tunnel Endpoint | M | | GTP Tunnel Endpoint 9.2.1 | MeNB endpoint of the X2 transport bearer. For delivery of UL PDUs. | — | — |
| >>>>Flow Control Indication | M | | 9.2.yy | Indication of the need of flow control | — | — |
| MeNB to SeNB Container | M | | OCTET STRING | Includes the necessary RRC information as specified for DC operation in TS 36.331 [9] | YES | reject |

Fig. 14

SENB ADDITION REQUEST

This message is sent by the MeNB to the SeNB to request the preparation of resources for dual connectivity operation for specific UE Direction: MeNB → SeNB.

| IE/Group Name | Presence | Range | IE type and reference | Semantics description | Criticality | Assigned Criticality |
|---|---|---|---|---|---|---|
| E-RABs To Be Added List | | 1 | | | ... | ... |
| >E-RABsTo Be Added Item | | 1..<maxnoof Bearers> | | | EACH | reject |
| >>CHOICE Bearer Option | M | | | | ... | ... |
| >>>SCG Bearer | | | | | | |
| >>>>E-RAB ID | M | | 9.2.23 | | ... | ... |
| >>>>E-RAB Level QoS Parameters | M | | 9.2.9 | Includes necessary QoS parameters | ... | ... |
| >>>>DL Forwarding | O | | 9.2.5 | | ... | ... |
| >>>>S1 UL GTP Tunnel Endpoint | M | | GTP Tunnel Endpoint 9.2.1 | SGW endpoint of the S1 transport bearer. For delivery of UL PDUs. | ... | ... |
| >>>Split Bearer | | | | | | |
| >>>>E-RAB ID | M | | 9.2.23 | | ... | ... |
| >>>>E-RAB Level QoS Parameters | M | | 9.2.9 | Includes necessary QoS parameters | ... | ... |
| >>>>MeNB GTP Tunnel Endpoint | M | | GTP Tunnel Endpoint 9.2.1 | MeNB endpoint of the X2 transport bearer. For delivery of UL PDUs. | ... | ... |
| MeNB to SeNB Container | M | | OCTET STRING | Includes the necessary RRC Information as specified for DC operation in TS 36.331 [9] | YES | reject |
| >>>>Flow Control Indication | M | | 9.2.yy | Indication of the need of flow control | ... | ... |

Fig. 15

9.2.yy Flow Control Indication
This information element indicates whether the flow control feedback is requested or not.

| IE/Group Name | Presence | Range | IE type and reference | Semantics description | Criticality | Assigned Criticality |
|---|---|---|---|---|---|---|
| Flow Control Indication | M | | ENUMERATED (Flow Control Feedback requested, Flow Control Feedback Not requested, ...) | | -- | -- |

Fig. 16

9.2.yy Flow Control Indication
This information element indicates whether the flow control feedback is requested or not.

| IE/Group Name | Presence | Range | IE type and reference | Semantics description | Criticality | Assigned Criticality |
|---|---|---|---|---|---|---|
| Flow Control Indication | M | | BOOLEAN | TRUE corresponds to Flow Control Feedback requested and FALSE corresponds to Flow Control Feedback not requested | — | — |

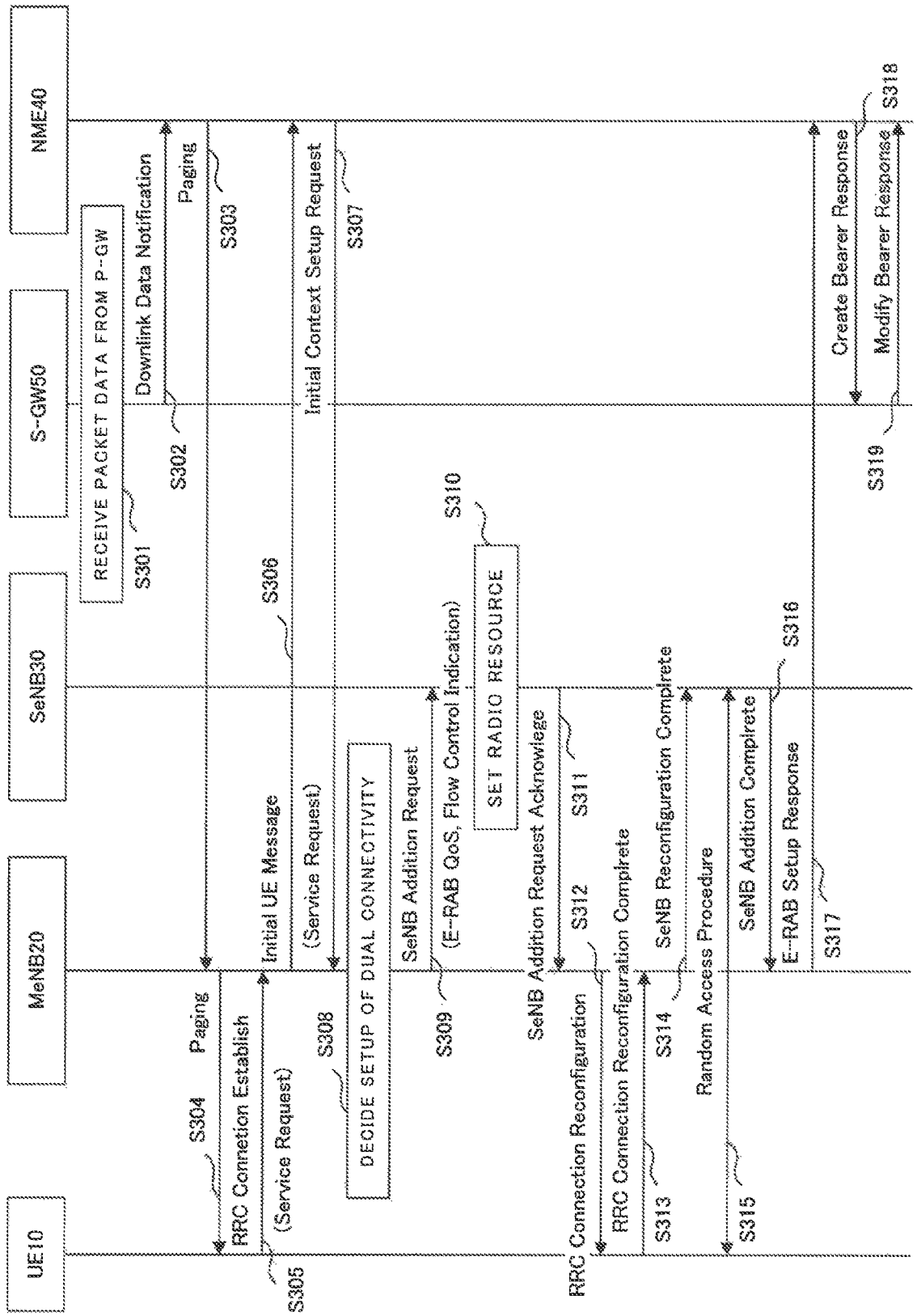

Fig. 18

9.2.yy Flow Control Period
This information element indicates the time period of the flow control feedback

| IE/Group Name | Presence | Range | IE type and reference | Semantics description | Criticality | Assigned Criticality |
|---|---|---|---|---|---|---|
| Flow Control Period | M | | INTEGER(0..2047) | 0 means Flow Control Feedback is not requested. The value other than 0 mean the time period that SeNB is requested to give Flow Control Feedback | — | — |

Format of Flow Control Frame

Format of Flow Control Frame

OVERALL CONFIGURATION OF WIRELESS COMMUNICATION SYSTEM
ACHIEVING DUAL CONNECTIVITY

BASE STATION, WIRELESS COMMUNICATION SYSTEM, AND COMMUNICATION METHOD

CROSS-REFERENCE TO RELATED PATENT APPLICATIONS

This application is a Continuation Application of U.S. application Ser. No. 15/501,990, filed Feb. 6, 2017, which is a National Stage Entry of International Application No. PCT/JP2015/067638, filed Jun. 18, 2015, which claims priority from Japanese Patent Application No. 2014-161013, filed Aug. 7, 2014. The entire contents of the above-referenced applications are expressly incorporated herein by reference.

TECHNICAL FIELD

The present invention relates to a base station, a wireless communication system, and a communication method.

BACKGROUND ART

The 3rd Generation Partnership Project (3GPP) specifies an EUTRAN (Evolved UMTS Terrestrial Radio Access Network. UMTS: Universal Mobile Telecommunications System) network referred to as Dual Connectivity, in which two eNode Bs (eNBs) and User Equipment (UE) transmit and receive packet data to and from one another.

FIG. 1 illustrates an example of a configuration of a wireless communication system achieving Dual Connectivity.

The wireless communication system illustrated in FIG. 1 includes UE 10, a Master eNode B (MeNodeB. Hereinafter, represented as a MeNB) 20, a Secondary eNode B (SeNodeB. Hereinafter, represented as a SeNB) 30, a Mobility Management Entity (MME) 40, and a Serving Gateway (S-GW) 50.

The MeNB 20 is a master cell base station.

The SeNB 30 is a small cell base station. Note that a cell under the control of the SeNB 30 (SCG: Secondary Cell Group) is located within a coverage area of a cell under the control of the MeNB 20 (MCG: Master Cell Group).

The UE 10 is a terminal that receives downlink (DL) packet data from the two of the MeNB 20 and the SeNB 30. Note that the UE 10 is to transmit uplink (UL) packet data either to only the MeNB 20, or to the two of the MeNB 20 and the SeNB 30.

The MME 40 is a core network apparatus that is arranged in a core network (CN), and performs transmission in a control (C-) plane and manages movement of the UE 10.

The S-GW 50 is a core network apparatus that is arranged in a CN, and transmits packet data in a user (U-) plane.

Note that the MeNB 20 is connected with the SeNB 30 via an X2 Interface, and the MME 40 and the S-GW 50 are connected with the MeNB 20 and the SeNB 30 via an S1 Interface.

FIG. 2 illustrates an example of a connection configuration of a C-plane in Dual Connectivity.

A C-plane connection is made as illustrated in FIG. 2. The UE 10 being in a connected state in Dual Connectivity has only a connection of S1-MME between the MeNB 20 and the MME 40. In addition, the UE 10 has only a Radio Resource Control (RRC) connection present in a wireless section between the UE 10 and the MeNB 20. In other words, no RRC connection is present in at least a wireless section between the UE 10 and the SeNB 30. However, the SeNB 30 may sometimes create signal information associated with a RRC message to the UE 10 and transmit the created signal information to the UE 10 via the MeNB 20.

In addition, examples of a connection configuration of a U-plane in Dual Connectivity include a configuration with Split bearer option and a configuration with SCG bearer option.

FIG. 3 illustrates an example of a connection configuration of a U-plane when configured with the Split bearer option. FIG. 4 illustrates an example of a connection configuration of a Radio Protocol when configured with the Split bearer option.

As illustrated in FIGS. 3 and 4, in the case of the configuration with the Split bearer option, U-plane DL packet data is transmitted from the S-GW 50 to only the MeNB 20, and is not transmitted to the SeNB 30. Note that, in the configurations illustrated in FIGS. 3 and 4, a bearer from the MeNB 20 to the UE 10 is referred to as an MCG bearer, and a bearer from the SeNB 30 to the UE 10 is referred to as a SCG bearer (the same applies to FIGS. 5 and 6 to be described later).

As illustrated in FIG. 4, the UE 10, the MeNB 20, and the SeNB 30 have a layer structure including a Packet Data Convergence Protocol (PDCP) layer, a Radio Link Control (RLC) layer, and a Medium Access Control (MAC) layer.

In the MeNB 20, U-plane DL packet data received from the S-GW 50 is accepted at a PDCP layer. Herein, one side of the PDCP layer of the MeNB 20 (right side of the layer in FIG. 4) can transmit a certain part of packet data (PDCP Protocol Data Unit (PDU)) to the UE 10 via a cell under the control of the MeNB 20, and can transmit a certain part of packet data (PDCP PDU) to the UE 10 via the SeNB 30. In other words, the PDCP layer of the MeNB 20 can split U-plane packet data.

In such a configuration with the Split bearer option, flow control is introduced, whereby the MeNB 20 feeds back a flow control signal from the SeNB 30 and adjusts, by using the flow control signal, an amount of DL packet data (an amount of PDCP PDUs) to be transmitted to the SeNB 30 for a purpose of sufficiently utilizing resources of the SeNB 30 without oppressing the resources of the SeNB 30.

The flow control signal includes information that indicates a status of the SeNB 30 in transmission of DL packet data received from the MeNB 20 to the UE 10, and information that indicates an amount of remaining buffer of the SeNB 30. Besides, the flow control signal may include, for example, information relating to transmission power of the SeNB 30, a number of bearers that the SeNB 30 can accommodate, and a maximum bit rate that the SeNB 30 can accommodate.

Herein, a mechanism of flow control is described below using a specific example.

The MeNB 20 transmits packet data with PDCP sequence number (SN) #100, #102, #104, #106, and #108 to the UE 10 via a cell under the control of the MeNB 20. On the other hand, the MeNB 20 transmits packet data with PDCP SN #101, #103, #105, #107, #109, and #111 to the SeNB 30.

Assume that the SeNB 30 has received all packet data with PDCP SN #101, #103, #105, #107, #109, and #111 and has successfully transmitted all the packet data to the UE 10. In addition, assume that the SeNB 30 has determined that all the packet data have been transmitted by receiving RLC Acks from the UE 10. In this case, the SeNB 30 feeds back, to the MeNB 20, an amount of remaining buffer of the SeNB 30 together with SN #111 as a PDCP SN for which a RLC Ack has been received last in order from the UE 10, as a flow control signal. Herein, by showing SN #111 as a "PDCP SN for which a RLC Ack has been received last in order from the UE 10" to the MeNB 20, the MeNB 20 can determine that all the packet data with PDCP SN #101, #103, #105, #107, and #109 have been successfully transmitted to the UE 10. Note that reception of a RLC Ack from the UE 10 is equivalent to reception of a Status PDU (or Status Report) that is called in NPL 1 (3GPP TS 36.322 V12.0.0).

Upon determining that all of the packet data (PDCP PDUs) transmitted to the SeNB 30 have been transmitted to the UE 10, the MeNB 20 looks at the amount of remaining buffer of the SeNB 30 and adjusts an amount of packet data (an amount of PDCP PDUs) to be next transmitted to the SeNB 30.

Note that the configuration with the SCG bearer option out of the above-described U-plane connection configurations in Dual Connectivity is irrelevant to the present invention, but is briefly described below for reference.

FIG. 5 illustrates an example of a connection configuration of a U-plane when configured with the SCG bearer option. FIG. 6 illustrates an example of a connection configuration of a Radio Protocol when configured with the SCG bearer option.

As illustrated in FIGS. 5 and 6, in the case of the configuration with the SCG bearer option, U-plane DL packet data is transmitted to both the MeNB 20 and the SeNB 30 from the S-GW 50, and is transmitted to the UE 10 via cells respectively under the control of the MeNB 20 and the SeNB 30.

In such a configuration with the SCG bearer option, packet data transmitted and received between the CN and the UE 10 never passes through X2-U. However, in a case of, for example, addition and deletion of the SeNB 30, X2-U is used in order to carry out data forwarding for forwarding packet data remaining in one of the MeNB 20 and the SeNB 30 to the other.

CITATION LIST

Non Patent Literature

NPL 1: 3GPP TS 36.322 V12.0.0 (2014-06)

SUMMARY OF INVENTION

Technical Problem

However, when a second base station (MeNB) has a configuration whereby downlink data received from a CN can be transmitted to a terminal (UE) via the own base station and a first base station (SeNB) as in, for example, the configuration with the Split bearer option, there is a problem as follows.

For example, when a second base station is a macro base station, the second base station may be sometimes connected with a large number of first base stations. However, when it comes to receiving a large quantity of flow control signals by the second base station from a large number of the first base stations, a processing load associated with flow control of the second base station increases. As a result, there arises a possibility of failing to obtain an advantageous effect such as an increase in throughput and an increase in communication speed, which is originally supposed to be aimed at by Dual Connectivity.

In addition, assume that, for example, there is a user who is in his/her office and rarely moves in the daytime. In transmitting packet data to such a user's terminal, a second base station can avoid passing the packet data through a cell under the control of the second base station. In other words, the second base station can transmit all packet data to the terminal via a cell of a first base station. In this configuration, the first base station may be a dedicated SeNB for Dual Connectivity of the second base station in some case, and a flow control signal from the first base station is unnecessary in this case. In this configuration, even when, for example, the first base station is a Pico eNB and a large number of the first base stations are disposed in an area, the first base stations are not directly connected with a MME in order to reduce a connection load to the MME. In other words, in this configuration, a Pico eNB with a function of a SeNB is a dedicated SeNB.

In this way, eliminating necessity of a flow control signal to be fed back from a first base station to a second base station remains a problem in the configuration with the Split bearer option, for example.

In view of the above, an object to be achieved by exemplary embodiments disclosed herein is to provide a base station, a wireless communication system, and a communication method that can solve the above-described problem.

Solution to Problem

A base station according to the present invention is
a base station capable of transmitting, to a terminal via the own base station and another base station, downlink data received from a core network, and includes
a communication unit that transmits, to the other base station, information capable of identifying whether flow control can be carried out or not.

A wireless communication system according to the present invention includes:
a first base station; and
a second base station capable of transmitting, to a terminal via the own base station and the first base station, downlink data received from a core network, wherein
the second base station
transmits, to the first base station, information capable of identifying whether flow control can be carried out or not.

A communication method according to the present invention is
a communication method by a base station capable of transmitting, to a terminal via the own base station and another base station, downlink data received from a core network, and includes
transmitting, to the other base station, information capable of identifying whether flow control can be carried out or not.

Advantageous Effects of Invention

The present invention can obtain an advantageous effect of making it possible to eliminate necessity of a flow control signal to be fed back from a first base station to a second base station.

BRIEF DESCRIPTION OF DRAWINGS

FIG. 11 is a sequence diagram illustrating an example of a procedure of setting up Dual Connectivity according to a third exemplary embodiment of the present invention.

FIG. 12 is a flow diagram illustrating an example of processing of determining whether flow control can be carried out or not by a MeNB according to the third exemplary embodiment of the present invention.

FIG. 13 is a diagram illustrating an example of a SeNB Addition Request message according to the third exemplary embodiment of the present invention.

FIG. 14 is a diagram illustrating another example of a SeNB Addition Request message according to the third exemplary embodiment of the present invention.

FIG. 15 is a diagram illustrating another example of an IE of a Flow Control Indication according to the third exemplary embodiment of the present invention.

FIG. 16 is a diagram illustrating further another example of an IE of a Flow Control Indication according to the third exemplary embodiment of the present invention.

FIG. 17 is a sequence diagram illustrating an example of a procedure of setting up Dual Connectivity according to a fourth exemplary embodiment of the present invention.

FIG. 18 is a diagram illustrating an example of an IE of a Flow Control Period according to a sixth exemplary embodiment of the present invention.

DESCRIPTION OF EMBODIMENTS

In the following, exemplary embodiments of the present invention are described with reference to the drawings.

(1) First Exemplary Embodiment

Figure 1:
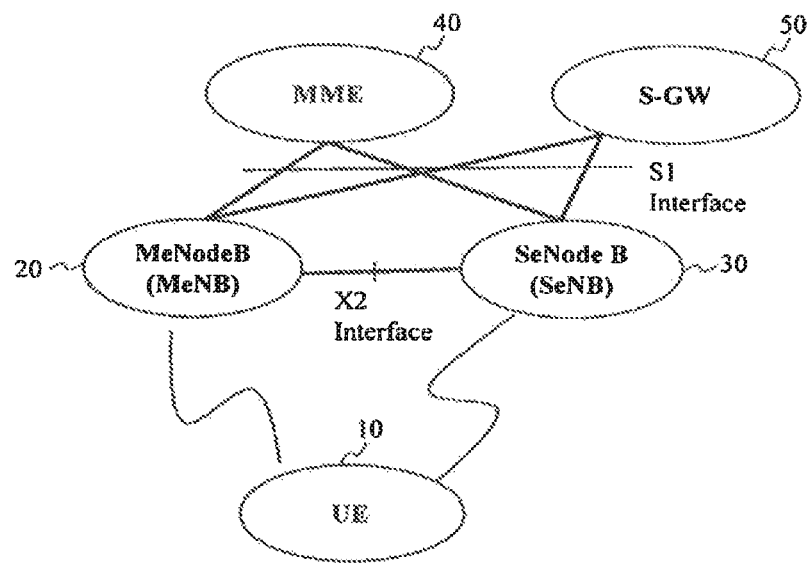
FIG. 1 is a diagram illustrating an example of an overall configuration of a wireless communication system achieving Dual Connectivity.
Figure 2:
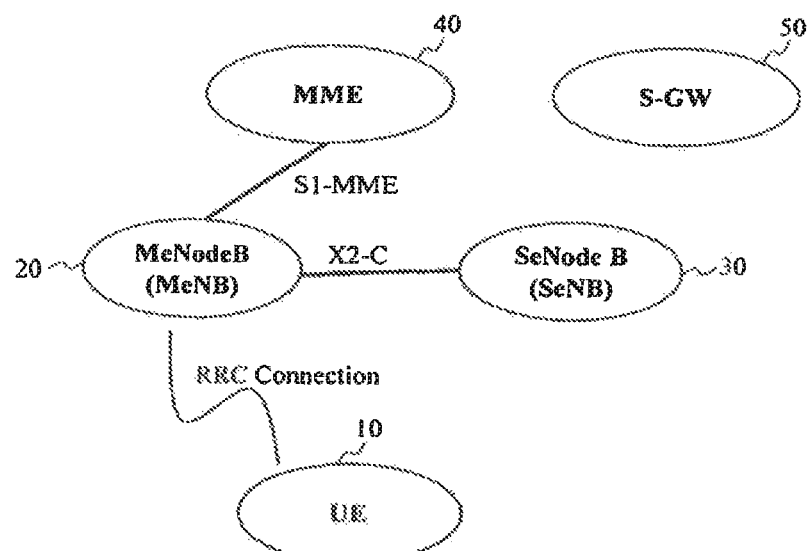
FIG. 2 is a diagram illustrating an example of a connection configuration of a C-plane in Dual Connectivity.
Figure 3:
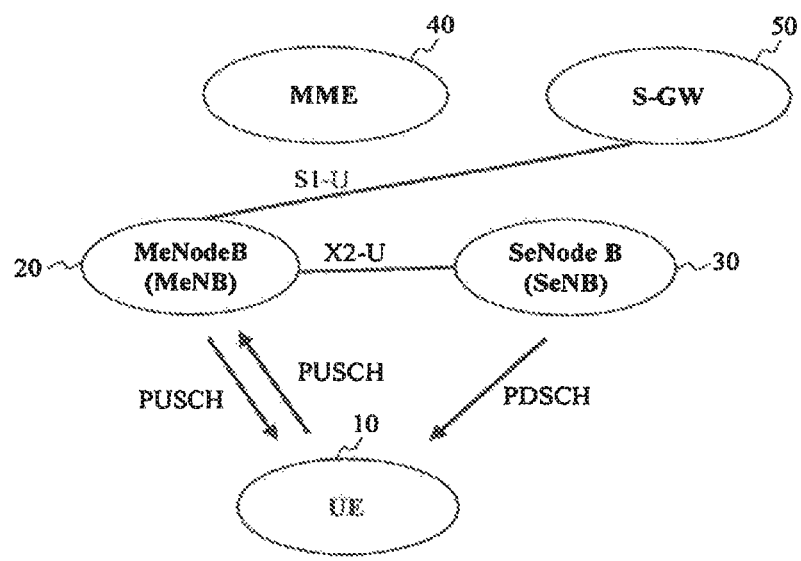
FIG. 3 is a diagram illustrating an example (Split bearer option) of a connection configuration of a U-plane in Dual Connectivity.
Figure 4:
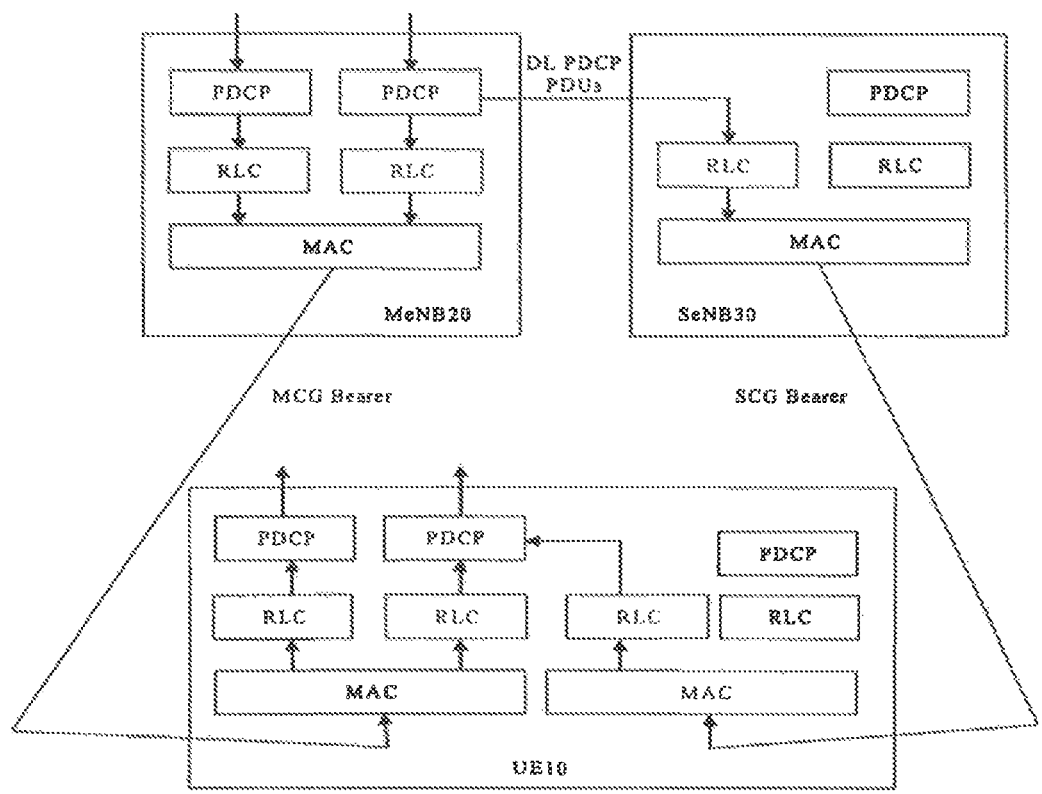
FIG. 4 is a diagram illustrating an example (Split bearer option) of a connection configuration of a Radio Protocol in Dual Connectivity.
Figure 5:
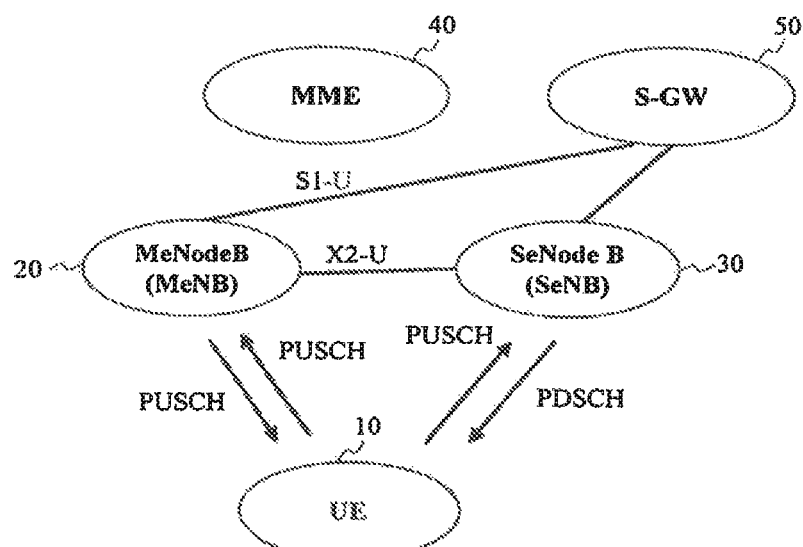
FIG. 5 is a diagram illustrating another example (SCG bearer option) of a connection configuration of a U-plane in Dual Connectivity.
Figure 6:
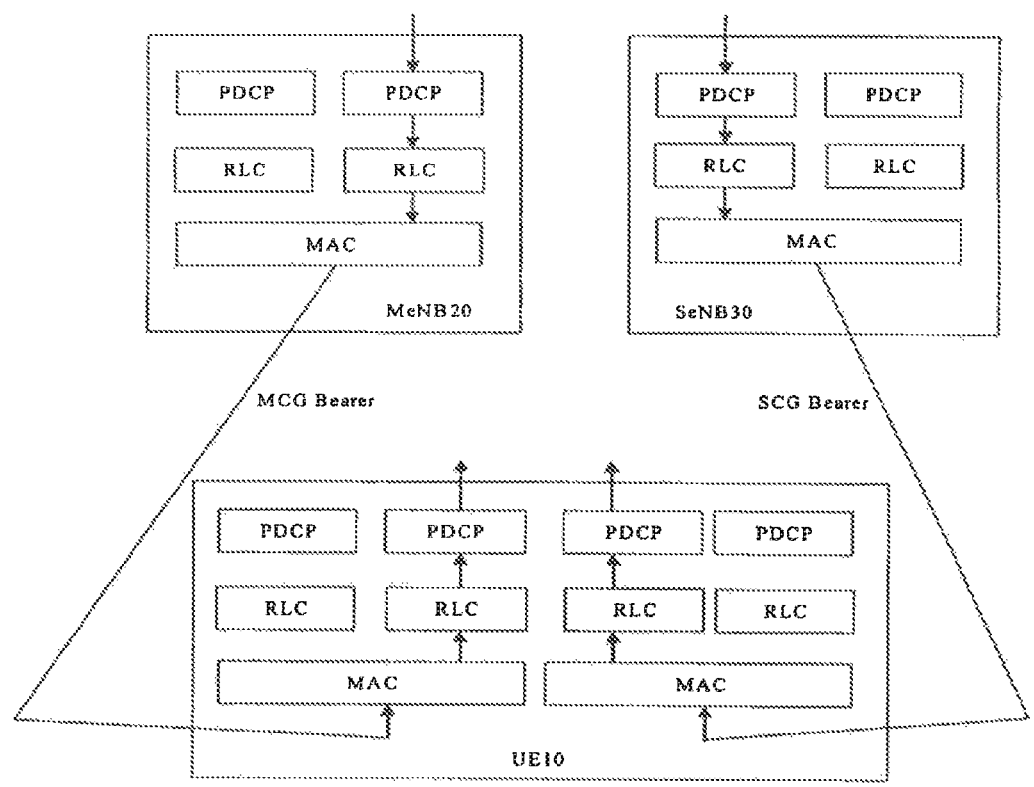
FIG. 6 is a diagram illustrating another example (SCG bearer option) of a connection configuration of a Radio Protocol in Dual Connectivity.

An overall configuration itself of a wireless communication system according to the present exemplary embodiment is the same as that in FIG. 1. However, new functions have been added to the MeNB 20 and the SeNB 30.

Now, configurations of a MeNB 20 and a SeNB 30 are described below in detail.

The SeNB 30 is a first base station.

The MeNB 20 is a second base station. The MeNB 20 is capable of setting up Dual Connectivity and transmitting, to UE 10 via the MeNB 20 (via a cell of the MeNB 20) and the SeNB 30, DL packet data received from a CN.

Figure 7:
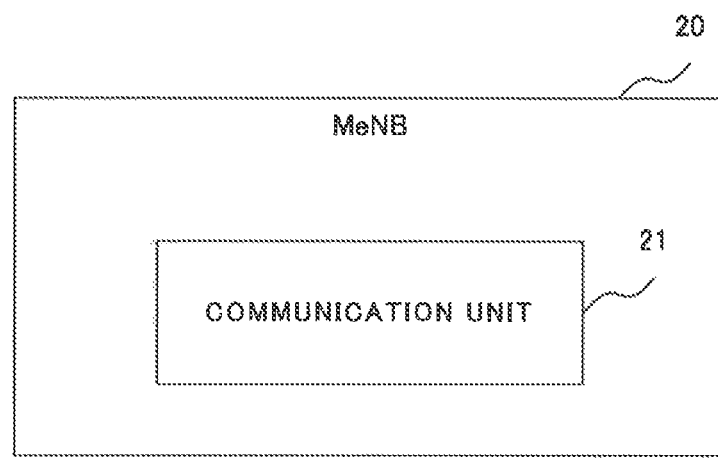
FIG. 7 is a block diagram illustrating an example of a configuration of a MeNB according to a first exemplary embodiment of the present invention.

FIG. 7 illustrates an example of the configuration of the MeNB 20.

As illustrated in FIG. 7, the MeNB 20 includes a communication unit 21.

The communication unit 21 transmits, to the SeNB 30, information capable of identifying whether flow control can be carried out or not. The flow control indicates feeding back a flow control signal from the SeNB 30 and adjusting, by using the flow control signal, an amount of DL packet data to be transmitted to the SeNB 30.

Figure 8:
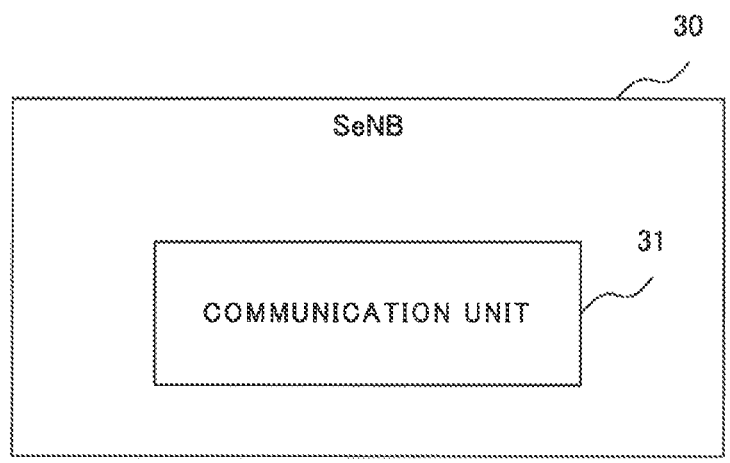
FIG. 8 is a block diagram illustrating an example of a configuration of a SeNB according to the first exemplary embodiment of the present invention.

FIG. 8 illustrates an example of the configuration of the SeNB 30.

As illustrated in FIG. 8, the SeNB 30 includes a communication unit 31.

The communication unit 31 receives, from the MeNB 20, information capable of identifying whether flow control can be carried out or not.

In the present exemplary embodiment, as described above, the MeNB 20 transmits, to the SeNB 30, information capable of identifying whether flow control can be carried out or not by the MeNB 20.

Accordingly, since the SeNB 30 can identify whether flow control can be carried out or not, necessity of a flow control signal from the SeNB 30 to the MeNB 20 can be eliminated when flow control cannot be carried out. This can reduce a processing load associated with flow control of the MeNB 20, and therefore, an advantageous effect that Dual Connectivity originally has, such as an increase in throughput and an increase in communication speed, can be obtained.

In addition, when the MeNB 20 transmits all packet data to the UE 10 via a cell of the SeNB 30, necessity of a flow control signal from the SeNB 30 to the MeNB 20 can be eliminated.

(2) Second Exemplary Embodiment

An overall configuration itself of a wireless communication system according to the present exemplary embodiment is the same as that in the first exemplary embodiment. However, modifications have been made to the configurations of the MeNB 20 and the SeNB 30 in the first exemplary embodiment.

Now, configurations of a MeNB 20 and a SeNB 30 are described below in detail.

Figure 9:
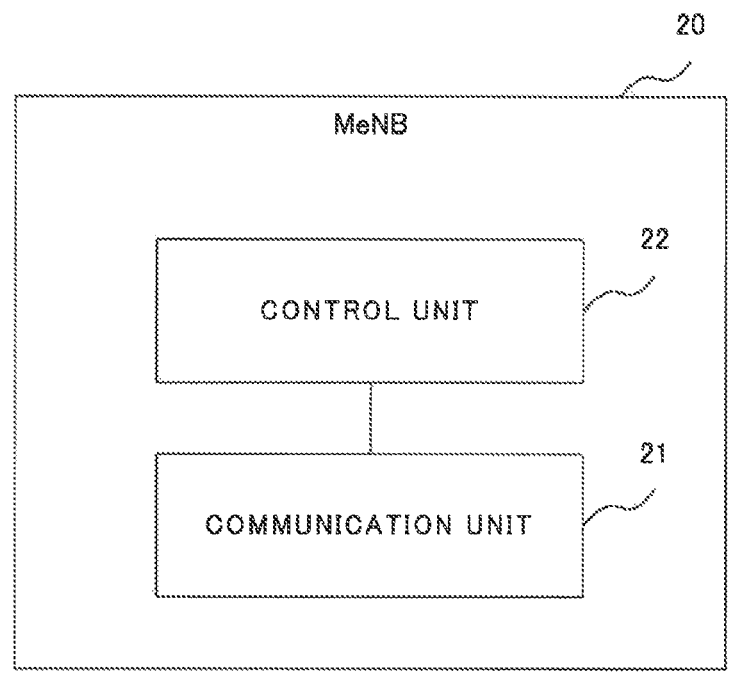
FIG. 9 is a block diagram illustrating an example of a configuration of a MeNB according to a second exemplary embodiment of the present invention.

FIG. 9 illustrates an example of the configuration of the MeNB 20.

As illustrated in FIG. 9, the MeNB 20 includes a control unit 22 additionally in comparison with the first exemplary embodiment.

The control unit 22 decides whether flow control can be carried out or not by the MeNB 20.

The communication unit 21 transmits, to the SeNB 30, information capable of identifying whether flow control can be carried out or not, which has been decided by the control unit 22.

Note that the control unit 22 and the communication unit 21 also perform an operation for achieving the function of the MeNB described in Background Art, besides the above-described operations.

Figure 10:
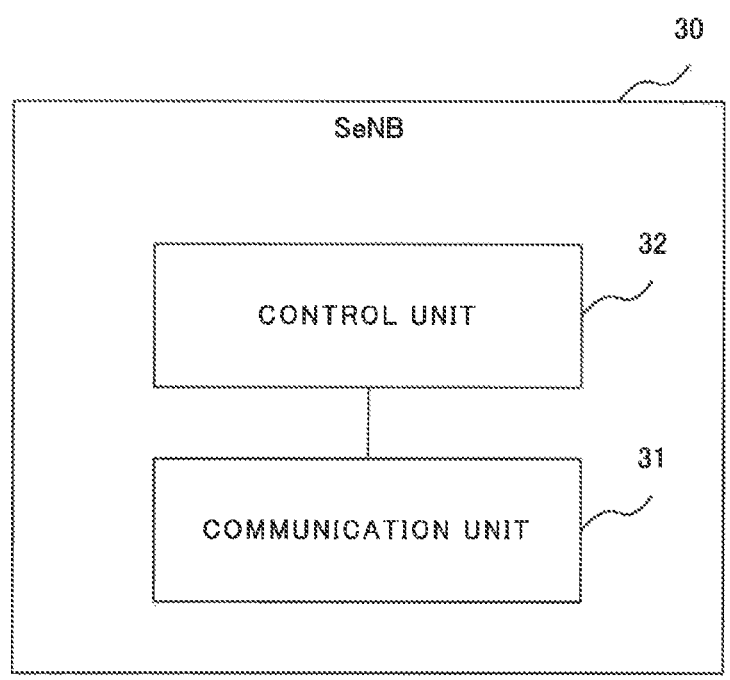
FIG. 10 is a block diagram illustrating an example of a configuration of a SeNB according to the second exemplary embodiment of the present invention.

FIG. 10 illustrates an example of the configuration of the SeNB 30.

As illustrated in FIG. 10, the SeNB 30 includes a control unit 32 additionally in comparison with the first exemplary embodiment.

The communication unit 31 receives, from the MeNB 20, information capable of identifying whether flow control can be carried out or not.

The control unit 32 identifies whether flow control can be carried out or not based on information capable of identifying whether flow control can be carried out or not, which has been received from the MeNB 20, and controls feedback of a flow control signal to the MeNB 20. Specifically, when flow control can be carried out, a flow control signal is fed back to the MeNB 20. On the other hand, when flow control cannot be carried out, a flow control signal is not fed back. Note that the expression "a flow control signal is not fed back" may be "a flow control signal is not transmitted to the MeNB 20".

Note that the control unit 32 and the communication unit 31 also perform an operation for achieving the function of the SeNB described in Background Art, besides the above-described operations.

In the present exemplary embodiment, as described above, the MeNB 20 transmits, to the SeNB 30, information capable of identifying whether flow control can be carried out or not by the MeNB 20.

Accordingly, since the SeNB 30 can identify whether flow control can be carried out or not, an advantageous effect similar to that in the first exemplary embodiment can be obtained.

(3) Third Exemplary Embodiment

The present exemplary embodiment is a more detailed version of the operation of the second exemplary embodiment, and an overall configuration of a wireless communication system and configurations of a MeNB 20 and a SeNB 30 are the same as those in the second exemplary embodiment.

An operation of the wireless communication system according to the present exemplary embodiment is described below in detail with reference to FIG. 11.

FIG. 11 illustrates an example of a procedure of setting up Dual Connectivity in the wireless communication system according to the present exemplary embodiment. Note that the example in FIG. 11 is based on the premise that UE 10 is already in a connected state.

In reference to FIG. 11, upon receiving DL packet data from a not-illustrated Packet Data Network Gateway (P-GW) or receiving a Create Bearer Request message from a not-illustrated P-GW at Step S101, a S-GW 50 transmits a Create Bearer Request message to a MME 40 for a purpose of setting up an EUTRAN-Radio Access Bearer (E-RAB) for the UE 10 at Step S102.

Upon receiving the Create Bearer Request message from the S-GW 50, the MME 40 transmits, to the MeNB 20 where the UE 10 is located, an E-RAB Setup Request message at Step S103.

Upon receiving the E-RAB Setup Request message from the MME 40, a control unit 22 of the MeNB 20 determines whether to set up Dual Connectivity or not at Step S104. In addition, when setting up Dual Connectivity, the control unit 22 also determines whether flow control can be carried out or not.

FIG. 12 illustrates an example of a procedure of determining whether flow control can be carried out or not by the MeNB 20 at Step S104 in FIG. 11.

In reference to FIG. 12, the control unit 22 of the MeNB 20 firstly determines a communication type of an E-RAB to be set for the UE 10 at Step S201.

When the communication type of the E-RAB belongs to a real-time service such as sound at Step S201, the control unit 22 of the MeNB 20 determines that setting up Dual Connectivity is unnecessary at Step S202, and the processing ends.

On the other hand, when the communication type of the E-RAB belongs to a non-real-time service such as data at Step S201, the control unit 22 of the MeNB 20 then determines whether the UE 10 is located within a cell under the control of the SeNB 30 at Step S203.

When the UE 10 is not located within a cell under the control of the SeNB 30 at Step S203, the control unit 22 of the MeNB 20 determines that setting up Dual Connectivity is unnecessary at Step S202, and the processing ends.

On the other hand, when the UE 10 is located within a cell under the control of the SeNB 30 at Step S203, the control unit 22 of the MeNB 20 determines that setting up Dual Connectivity is necessary at Step S204.

Subsequently, the control unit 22 of the MeNB 20 determines, at Step S205, whether a processing capability of the MeNB 20 exceeds an upper limit or not when the MeNB 20 is connected with the SeNB 30.

When a processing capability of the MeNB 20 exceeds an upper limit at Step S205, the control unit 22 of the MeNB 20 determines that flow control cannot be carried out at Step S206, and the processing ends.

On the other hand, a processing capability of the MeNB 20 does not exceed an upper limit at Step S205, the control unit 22 of the MeNB 20 determines that flow control can be carried out at Step S207, and the processing ends.

Note that determination whether flow control can be carried out or not at Step S205 may be made by other methods, besides determining by whether a processing capability of the MeNB 20 exceeds an upper limit or not.

For example, the determination may be made by a load status of the MeNB 20. For example, when a Central Processing Unit (CPU) usage rate is used as an index for a load status of the MeNB 20, determination that flow control cannot be carried out may be made when the CPU usage rate is higher than a threshold value.

Alternatively, the determination may be also made by Quality of Service (QoS) of an E-RAB. For example, determination that flow control can be carried out may be made for an E-RAB with high QoS (i.e., with high priority) in order to provide a better service. Conversely, determination that flow control cannot be carried out may be made for an E-RAB with low QoS (i.e., with low priority).

In reference again to FIG. 11, when determining that setting up Dual Connectivity is necessary at Step S104, the control unit 22 of the MeNB 20 sets, at Step S105, information capable of identifying whether flow control can be carried out or not (Flow Control Indication), which has been determined at Step S104, in a SeNB Addition Request message. The communication unit 21 of the MeNB 20 transmits the SeNB Addition Request message to the SeNB 30. The Flow Control Indication herein refers to an information element (IE) indicating either flow control can be carried out or cannot be carried out.

FIG. 13 illustrates an example of the SeNB Addition Request message.

In the SeNB Addition Request message illustrated in FIG. 13, a Flow Control Indication is shown inside an E-RAB list. This means that a Flow Control Indication is set for each E-RAB.

However, a Flow Control Indication may be set for each UE 10, rather than being set for each E-RAB.

FIG. 14 illustrates another example of the SeNB Addition Request message.

In the SeNB Addition Request message illustrated in FIG. 14, a Flow Control Indication is shown outside an E-RAB list. This means that a Flow Control Indication is set for each UE 10.

FIGS. 15 and 16 each illustrate another example of an IE of a Flow Control Indication.

In the example illustrated in FIG. 15, whether flow control can be carried out or cannot be carried out is represented by "ENUMERATED". In addition, in the example illustrated in FIG. 16, whether flow control can be carried out or cannot be carried out is represented by "TRUE" or "FALSE".

Note that FIGS. 13 to 16 each illustrate an example when an IE of a Flow Control Indication is mandatory (M), and the Flow Control Indication indicates either flow control can be carried out or cannot be carried out.

However, when an IE of a Flow Control Indication is optional (O), absence of the IE may mean that flow control cannot be carried out.

In reference again to FIG. 11, upon receiving the SeNB Addition Request message from the MeNB 20, the control unit 32 of the SeNB 30 sets a radio resource for executing Dual Connectivity at Step S106. The communication unit 31 of the SeNB 30 replies a SeNB Addition Request Acknowledge message to the MeNB 20 at Step S107.

Upon receiving the SeNB Addition Request Acknowledge message from the SeNB 30, the communication unit 21 of the MeNB 20 transmits a RRC Connection Reconfiguration message to the UE 10 and sets a radio resource for the SeNB 30 at Step S108.

Upon receiving the RRC Connection Reconfiguration message from the MeNB 20, the UE 10 replies a RRC Connection Reconfiguration Complete message to the MeNB 20 at Step S109.

Upon receiving the RRC Connection Reconfiguration Complete message from the UE 10, the communication unit 21 of the MeNB 20 replies a SeNB Reconfiguration Complete message to the SeNB 30 and notifies that the UE 10 is ready at Step S110.

Subsequently, the UE 10 sets a radio resource for the SeNB 30 and executes a Random Access Procedure at Step S111.

Upon completing setting of a radio resource for the UE 10, the communication unit 31 of the SeNB 30 transmits a SeNB Addition Complete message to the MeNB 20 at Step S112.

Upon receiving the SeNB Addition Complete message from the SeNB 30, the communication unit 21 of the MeNB 20 transmits an E-RAB Setup Response message to the MME 40 and notifies completion of setup of an E-RAB at Step S113. In the E-RAB Setup Response message, an Internet Protocol (IP) address of the MeNB 20 is set.

Upon receiving the E-RAB Setup Response message from the MeNB 20, the MME 40 transmits a Create Bearer Response message including the IP address of the MeNB 20 set therein to the S-GW 50 at Step S114. In response to this, the S-GW 50 sets up a GTP (GPRS Tunneling Protocol. GPRS: General Packet Radio Service) tunnel between the S-GW 50 and the MeNB 20, and transmission of DL packet data is initiated.

Thereafter, the communication unit 31 of the SeNB 30 feeds back a flow control signal to the MeNB 20 when being notified, by the Flow Control Indication in the SeNB Addition Request message received from the MeNB 20 at Step S105, that flow control can be carried out. On the other hand, the communication unit 31 of the SeNB 30 does not feed back a flow control signal when being notified that flow control cannot be carried out.

In the present exemplary embodiment, as described above, the MeNB 20 sets a Flow Control Indication indicating either flow control can be carried out or cannot be carried out in a SeNB Addition Request message, and transmits the SeNB Addition Request message to the SeNB 30.

Accordingly, since the SeNB 30 can identify whether flow control can be carried out or not, an advantageous effect similar to that in the first exemplary embodiment can be obtained.

Note that, in the present exemplary embodiment, when flow control cannot be carried out, an amount of DL packet data (an amount of PDCP PDUs) to be transmitted from the MeNB 20 to the SeNB 30 is static. In this case, the MeNB 20 may notify not only the SeNB 30 but also the UE 10 of information that "flow control cannot be carried out". When being notified of the information that "flow control cannot be carried out" from the MeNB 20 (or the SeNB 30), the UE 10 determines that there is no feedback from the SeNB 30 to the MeNB 20, and switches the control in such a way that a value of a Hyper Frame Number (HFN) is notified from the UE 10 to the MeNB 20.

In addition, since no flow control signal is to be fed back from the SeNB 30 to the MeNB 20 when flow control cannot be carried out, the MeNB 20 cannot know a transmission state of the SeNB 30. However, a HFN value in a PDCP of the MeNB 20 is required to be coincident with a HFN value in a PDCP of the UE 10. Thus, a PDCP Status Report message is periodically transmitted from the UE 10 to the MeNB 20, and the MeNB 20 receiving the PDCP Status Report message checks with a reception status in the PDCP of the UE 10. When there is a PDCP SN that has been transmitted by the MeNB 20 yet has not been received by the UE 10, it is conceivable that the MeNB 20 retransmits the PDCP SN. Alternatively, it is conceivable that the MeNB 20 attempts to reset the PDCP and causes the UE 10 to execute a procedure of re-setting a RRC Connection. By re-setting a RRC Connection by the UE 10, the SN of the PDCP is also reset, and hence, the HFN value in the PDCP of the MeNB 20 can be made coincident with the HFN value in the PDCP of the UE 10.

(4) Fourth Exemplary Embodiment

The third exemplary embodiment is based on the premise that the UE 10 is already in a connected state.

In contrast, the present exemplary embodiment is based on the premise that UE 10 is in an idle state.

An operation of a wireless communication system according to the present exemplary embodiment is described below in detail with reference to FIG. 17.

FIG. 17 illustrates a procedure of setting up Dual Connectivity in the wireless communication system according to the present exemplary embodiment. Note that the example in FIG. 17 is based on the premise that the UE 10 is in an idle state.

In reference to FIG. 17, upon receiving DL packet data from a not-illustrated P-GW at Step S301, a S-GW 50 transmits a Downlink Data Notification message to a MME 40 at Step S302.

Upon receiving the Downlink Data Notification message from the S-GW 50, the MME 40 transfers Paging to the UE 10 via a MeNB 20 where the UE 10 is located at Steps S303 and 304.

When the UE 10 replies a RRC Connection Establish message in response to the Paging at Step S305, a communication unit 21 of the MeNB 20 transmits an Initial UE Message to the MME 40 at Step S306.

Upon receiving the Initial UE Message from the MeNB 20, the MME 40 transmits an Initial Context Setup Request message to the MeNB 20 at Step S307.

Thereafter, processing of Steps S308 to S316 similar to that of Steps S104 to S122 in FIG. 11 in the third exemplary embodiment is performed.

Upon receiving the SeNB Addition Complete message from the SeNB 30, the communication unit 21 of the MeNB 20 transmits an Initial Context Setup Response message to the MME 40 at Step S317.

Upon receiving the Initial Context Setup Response message from the MeNB 20, the MME 40 transmits a Modify Bearer Request message to the S-GW 50 at Step S318. The S-GW 50 transmits a Modify Bearer Response message to the MME 40 at Step S319.

Thereafter, the communication unit 31 of the SeNB 30 feeds back a flow control signal to the MeNB 20 when being notified, by the Flow Control Indication in the SeNB Addition Request message received from the MeNB 20 at Step S309, that flow control can be carried out. On the other hand, the communication unit 31 of the SeNB 30 does not feed back a flow control signal when being notified that flow control cannot be carried out.

In the present exemplary embodiment, as described above, the MeNB 20 sets a Flow Control Indication indicating either flow control can be carried out or cannot be carried out in a SeNB Addition Request message, and transmits the SeNB Addition Request message to the SeNB 30, in the same way as in the third exemplary embodiment.

Accordingly, since the SeNB 30 can identify whether flow control can be carried out or not, an advantageous effect similar to that in the first exemplary embodiment can be obtained.

(5) Fifth Exemplary Embodiment

In the third and fourth exemplary embodiments, the MeNB 20 sets a Flow Control Indication in a SeNB Addition Request message.

In contrast, the present exemplary embodiment is different from the third and fourth exemplary embodiments in that a MeNB 20 sets a Flow Control Indication in a SeNB Modification Request message.

Specifically, in the third and fourth exemplary embodiments, the SeNB 30 is in an unset state of Dual Connectivity at a point of time when the MeNB 20 decides whether flow control can be carried out or not. Thus, the MeNB 20 sets a Flow Control Indication in a SeNB Addition Request message to be transmitted to the SeNB 30.

On contrary to this, when Dual Connectivity has been set up to a SeNB 30 at a point of time when the MeNB 20 decides whether flow control can be carried out or not, a new E-RAB is to be added to the SeNB 30. Thus, in that case, the MeNB 20 sets a Flow Control Indication in a SeNB Modification Request message to be transmitted to the SeNB 30.

In addition, it is also conceivable that a load status or the like of the MeNB 20 changes after notification of a Flow Control Indication from the MeNB 20 to the SeNB 30, and a status of whether flow control can be carried out or not changes (from "can be carried out" to "cannot be carried out", or, from "cannot be carried out" to "can be carried out").

In such a case as well, the MeNB 20 can set a post-change Flow Control Indication in a SeNB Modification Request message and transmit the SeNB Modification Request message to the SeNB 30.

In the present exemplary embodiment, as described above, the MeNB 20 sets a Flow Control Indication indicating either flow control can be carried out or cannot be carried out in a SeNB Modification Request message, and transmits the SeNB Modification Request message to the SeNB 30.

Accordingly, since the SeNB 30 can identify whether flow control can be carried out or not, an advantageous effect similar to that in the first exemplary embodiment can be obtained.

(6) Sixth Exemplary Embodiment

In the third to fifth exemplary embodiments, a Flow Control Indication is used as information capable of identifying whether flow control can be carried out or not.

In contrast, the present exemplary embodiment is different from the third to fifth exemplary embodiments in that a Flow Control Period indicating a time interval for feedback of a flow control signal is used as information capable of identifying whether flow control can be carried out or not.

FIG. 18 illustrates an example of an IE of a Flow Control Period.

In the example illustrated in FIG. 18, a MeNB 20 defines a time interval for feedback of a flow control signal as an interval of 0 seconds to 2047 seconds (second-scale interval). Note that the time interval may be defined as an interval by milliseconds.

When the time interval is 0, it means that feedback of a flow control signal is unnecessary (i.e., flow control cannot be carried out).

On the other hand, when the time interval takes a value other than 0, the value indicates a time interval for feedback of a flow control signal, meaning that flow control can be carried out.

The Flow Control Period can be set in a SeNB Addition Request message or in a SeNB Modification Request message and transmitted.

Note that a time interval for feedback of a flow control signal can be determined by a variety of methods.

For example, a time interval can be determined by a load status of the MeNB 20. For example, when a CPU usage rate is used as an index for a load status of the MeNB 20, a time interval can be extended as the CPU usage rate increases, for example.

Alternatively, a time interval can be also determined by QoS of an E-RAB. For example, a time interval can be shortened as QoS of an E-RAB increases, in order to provide a better service to an E-RAB with high QoS (i.e., with high priority).

In the present exemplary embodiment, as described above, the MeNB 20 notifies the SeNB 30 of a Flow Control Period indicating a time interval for feedback of a flow control signal.

Accordingly, since the SeNB 30 can identify whether flow control can be carried out or not, an advantageous effect similar to that in the first exemplary embodiment can be obtained.

(7) Seventh Exemplary Embodiment

In the third to fifth exemplary embodiments, a Flow Control Indication is used as information capable of identifying whether flow control can be carried out or not. In addition, in the sixth exemplary embodiment, a Flow Control Period is used as information capable of identifying whether flow control can be carried out or not.

In contrast, the present exemplary embodiment is different from the third to sixth exemplary embodiments in that All PDCP-PDU indicating that all of DL packet data (PDCP PDUs) are transmitted to UE 10 via a SeNB 30 is used as information capable of identifying whether flow control can be carried out or not.

Specifically, the MeNB 20 sets an IE of All PDCP-PDU in a SeNB Addition Request message or in a SeNB Modification Request message.

The All PDCP-PDU means that, as described above, all of DL packet data (PDCP PDUs) are transmitted to the UE 10 via the SeNB 30, and yet, at the same time, means that flow control cannot be carried out. Thus, feedback of a flow control signal from the SeNB 30 to the MeNB 20 is not necessary at all. This is advantageous in a case when a certain Pico eNB is a dedicated SeNB.

Note that an IE of All PDCP-PDU may be set to either of mandatory (M) or optional (O).

In the present exemplary embodiment, as described above, the MeNB 20 notifies the SeNB 30 of All PDCP-PDU indicating that all of DL packet data (PDCP PDUs) are transmitted to the UE 10 via the SeNB 30.

Accordingly, since the SeNB 30 can identify whether flow control can be carried out or not, an advantageous effect similar to that in the first exemplary embodiment can be obtained.

(8) Eighth Exemplary Embodiment

The present exemplary embodiment is different from the third to seventh exemplary embodiments in that information capable of identifying whether flow control can be carried out or not is transmitted by using a Frame Protocol or a User Plane Protocol for exchanging information between a MeNB 20 and a SeNB 30. The Frame Protocol or the User Plane Protocol is a protocol for transferring data.

Figure 19:
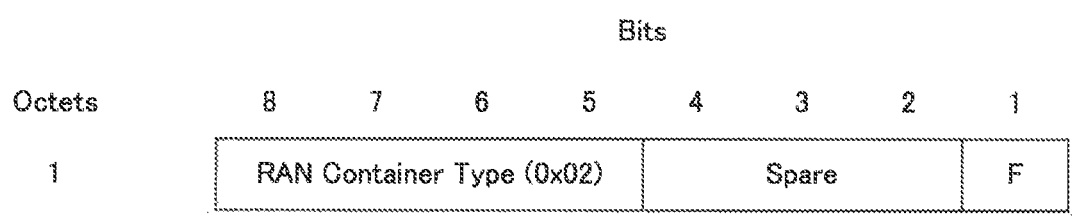
FIG. 19 is a diagram illustrating an example of a format of a Flow Control Frame according to an eighth exemplary embodiment of the present invention.
Figure 20:
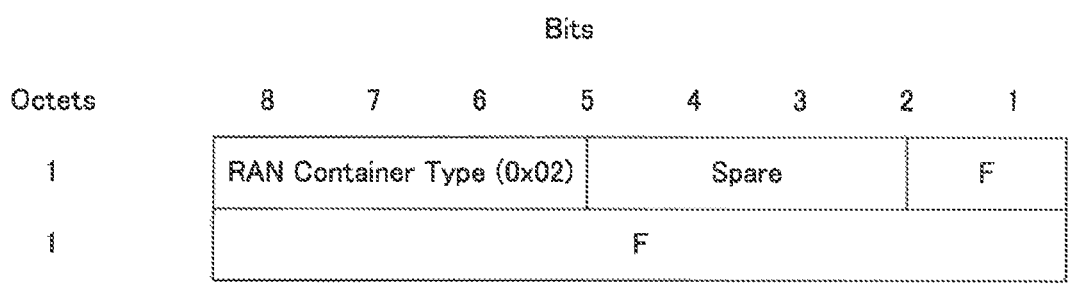
FIG. 20 is a diagram illustrating another example of a format of a Flow Control Frame according to the eighth exemplary embodiment of the present invention.

FIGS. 19 and 20 each illustrate an example of a format of a Flow Control Frame for transmitting information capable of identifying whether flow control can be carried out or not by using a Frame Protocol.

In the example illustrated in FIG. 19, an IE of a Frame Protocol indicates either flow control can be carried out or cannot be carried out, similarly to the third to fifth exemplary embodiments.

RAN Container Type (0x02) in FIG. 19 indicates that the frame is a Flow Control Frame.

Spare is unused and is always set to "0".

F is set to either "0" or "1". "1" indicates that flow control can be carried out, and "0" indicates that flow control cannot be carried out. In reverse thereto, however, it is also possible to define "0" as indicating that flow control can be carried out and "1" as indicating that flow control cannot be carried out.

In the example illustrated in FIG. 20, an IE of a Frame Protocol indicates a time interval for feedback of a flow control signal from the SeNB 30 to the MeNB 20, similarly to the sixth exemplary embodiment.

RAN Container Type (0x02) in FIG. 20 indicates that the frame is a Flow Control Frame.

Spare is unused and is always set to "0".

F is set to any one of values from "0 to 1023". "0" indicates that flow control cannot be carried out, and the other values indicate that flow control can be carried out and each of the values indicates a time interval for feedback of a flow control signal from the SeNB 30 to the MeNB 20. The time interval can be any value besides 1023.

Note that, in the present exemplary embodiment, a timing for transmitting information capable of identifying whether flow control can be carried out or not by using a Frame Protocol is any timing after completion of E-RAB setup, in other words, after completion of the processing in FIG. 11 or in FIG. 17.

In addition, as a method for selective use of FIGS. 19 and 20, it is conceivable that, for example, FIG. 19 is used when only 1 bit is allocated for F, and FIG. 20 is used in other cases.

In the present exemplary embodiment, as described above, the MeNB 20 transmits information capable of identifying whether flow control can be carried out or not by using a Frame Protocol.

Accordingly, since the SeNB 30 can identify whether flow control can be carried out or not, an advantageous effect similar to that in the first exemplary embodiment can be obtained.

(9) Ninth Exemplary Embodiment

In the second to eighth exemplary embodiments, the MeNB 20 decides whether flow control can be carried out or not, and decides a time interval for feedback of a flow control signal when flow control can be carried out.

In contrast, in the present exemplary embodiment, an operator decides whether flow control can be carried out or not and a time interval for feedback of a flow control signal when flow control can be carried out, and sets Operation & Maintenance (O&M) for information capable of identifying whether flow control can be carried out or not.

Figure 21:
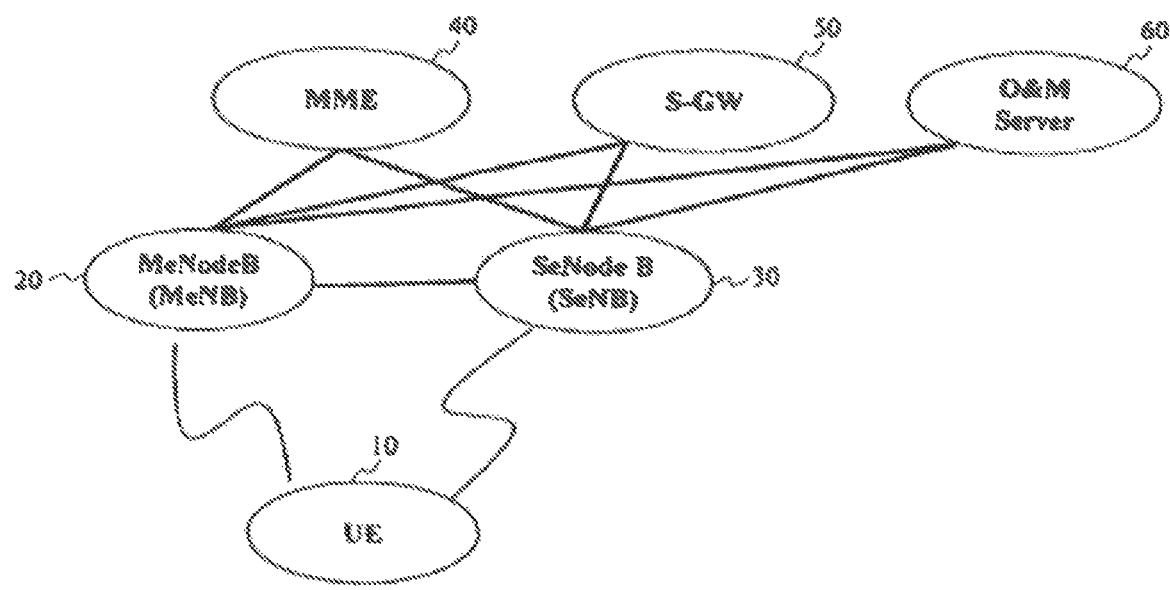
FIG. 21 is a diagram illustrating an example of an overall configuration of a wireless communication system according to a ninth exemplary embodiment of the present invention.

FIG. 21 illustrates another example of an overall configuration of a wireless communication system achieving Dual Connectivity.

The wireless communication system illustrated in FIG. 21 includes an O&M server 60 additionally in comparison with FIG. 1.

An operator sets information capable of identifying whether flow control can be carried out or not in the O&M server 60, and the O&M server 60 sets the information in a MeNB 20 and a SeNB 30.

In the present exemplary embodiment, as described above, the O&M server 60 sets information capable of identifying whether flow control can be carried out or not in the MeNB 20 and the SeNB 30.

Accordingly, since the SeNB 30 can identify whether flow control can be carried out or not, an advantageous effect similar to that in the first exemplary embodiment can be obtained.

(10) Tenth Exemplary Embodiment

In the first to eighth exemplary embodiments, the MeNB 20 transmits information capable of identifying whether flow control can be carried out or not directly to the SeNB 30.

In contrast, in the present exemplary embodiment, a MeNB 20 firstly transmits information capable of identifying whether flow control can be carried out or not to UE 10, and the UE 10 transmits the information to a SeNB 30.

Specifically, the MeNB 20 firstly transmits information capable of identifying whether flow control can be carried out or not, as Flow Control information, to the UE 10, and the UE 10 transmits the information, as Flow Control information, to the SeNB 30.

In the present exemplary embodiment, as described above, information capable of identifying whether flow control can be carried out or not is transmitted from the MeNB 20 to the SeNB 30 via the UE 10.

Accordingly, since the SeNB 30 can identify whether flow control can be carried out or not, an advantageous effect similar to that in the first exemplary embodiment can be obtained.

(11) Eleventh Exemplary Embodiment

In the first to eighth exemplary embodiments, the MeNB 20 transmits information capable of identifying whether flow control can be carried out or not directly to the SeNB 30.

In contrast, in the present exemplary embodiment, a MeNB 20 firstly transmits information capable of identifying whether flow control can be carried out or not to a CN side, and the CN side transmits the information to a SeNB 30.

Specifically, the MeNB 20 firstly transmits information capable of identifying whether flow control can be carried out or not, as Flow Control information, to a MME 40 within a CN, and the MME 40 transmits the information, as Flow Control information, to the SeNB 30.

In the present exemplary embodiment, as described above, information capable of identifying whether flow control can be carried out or not is transmitted from the MeNB 20 to the SeNB 30 via the CN.

Accordingly, since the SeNB 30 can identify whether flow control can be carried out or not, an advantageous effect similar to that in the first exemplary embodiment can be obtained.

In the above, the present invention has been described with reference to the exemplary embodiments. However, the present invention is not limited to the above-described exemplary embodiments. Various modifications that can be understood by those skilled in the art can be made to the configurations and details of the present invention within the scope of the present invention.

The invention claimed is:

1. A base station, comprising:
a controller controls downlink data flow transmitted to a terminal via another base station based on a feedback from the another base station;
a transmitter transmits, to the another base station, a downlink data and an information indicating whether the feedback is requested or not; and
a receiver receives the feedback from the another base station, if the information indicates the feedback is requested,
wherein the base station is configured to be a Split bearer option.

2. The base station according to claim 1,
wherein the feedback allows the base station to control downlink data flow which is transmitted to the another base station.

3. The base station according to claim 1,
wherein the feedback includes information related to delivery status of downlink data at the another base station towards the terminal.

4. A base station, comprising:
a receiver receives, from another base station, a downlink data and an information indicating whether a feedback is requested or not; and
a transmitter transmits the feedback to the another base station, if the information indicates the feedback is requested,
wherein the base station is configured to be a Split bearer option.

5. The base station according to claim 4,
wherein the feedback allows the another base station to control downlink data flow which is transmitted to the base station.

6. The base station according to claim 4,
wherein the feedback includes information related to delivery status of downlink data at the base station towards the terminal.

7. A method for a base station, the method comprising:
controlling downlink data flow transmitted to a terminal via another base station based on a feedback from the another base station;
transmitting, to the another base station, a downlink data and an information indicating whether the feedback is requested or not; and
receiving the feedback from the another base station, if the information indicates the feedback is requested,
wherein the base station is configured to be a Split bearer option.

8. The method according to claim 7,
wherein the feedback allows the base station to control downlink data flow which is transmitted to the another base station.

9. The method according to claim 7,
wherein the feedback includes information related to delivery status of downlink data at the another base station towards the terminal.

* * * * *